United States Patent [19]

Peabody et al.

[11] Patent Number: 5,087,019
[45] Date of Patent: Feb. 11, 1992

[54] SPREADER APPARATUS

[76] Inventors: Dennis J. Peabody, 1751 Bush Ave., St. Paul, Minn. 55106; James J. Borowske, 2587 E. 12th Ave., N. St. Paul, Minn. 55109-2435

[21] Appl. No.: 636,290

[22] Filed: Dec. 31, 1990

[51] Int. Cl.⁵ .............................. B66F 3/36
[52] U.S. Cl. ..................... 254/100; 254/133 R; 29/239
[58] Field of Search ............ 254/98, 100, 102, 133 R, 254/DIG. 4; 29/239; 269/53, 69, 243, 246, 902

[56] References Cited

U.S. PATENT DOCUMENTS

| | | | |
|---|---|---|---|
| 1,540,497 | 7/1925 | Pohlman et al. | 254/100 |
| 1,723,970 | 8/1929 | Jauch | 254/100 |
| 2,272,559 | 2/1942 | Hebbert | 29/239 |
| 2,532,168 | 11/1950 | Jakoubek | 254/100 |
| 2,594,443 | 4/1952 | Johnston | 254/100 |
| 3,325,095 | 6/1967 | Mueller et al. | 254/100 |

*Primary Examiner*—J. J. Hartman
*Attorney, Agent, or Firm*—Leon Gilden

[57] ABSTRACT

An apparatus wherein an elongate tube receives a threaded rod therewithin, wherein a medial sleeve including a threaded bore is rotatable to effect extension and retraction of the threaded rod relative to the tube. The tube and rod each include "J" shaped jaw member coaxially aligned with the tube and rod to engage opposed portions of an animal rib cage to effect a spreading of the rib cage subsequent to a hunting procedure. The sleeve may optionally include an annular array of blind bores to slidably receive an elongate peg member to enhance rotation of the sleeve relative to the rod.

1 Claim, 4 Drawing Sheets

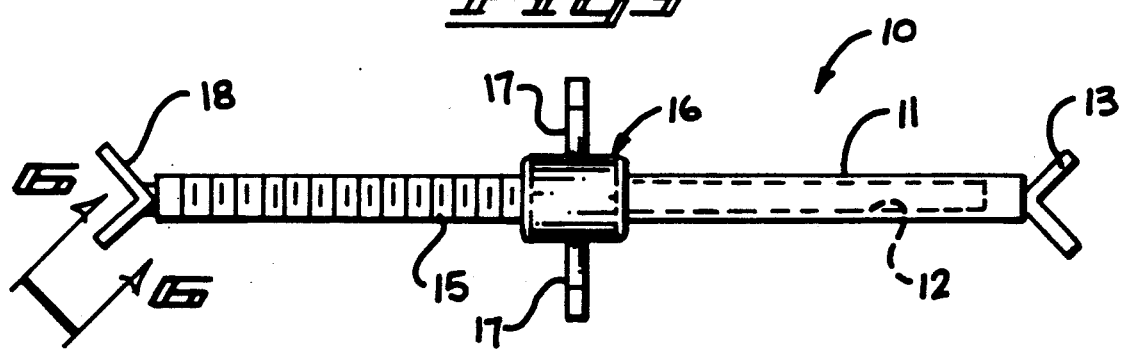
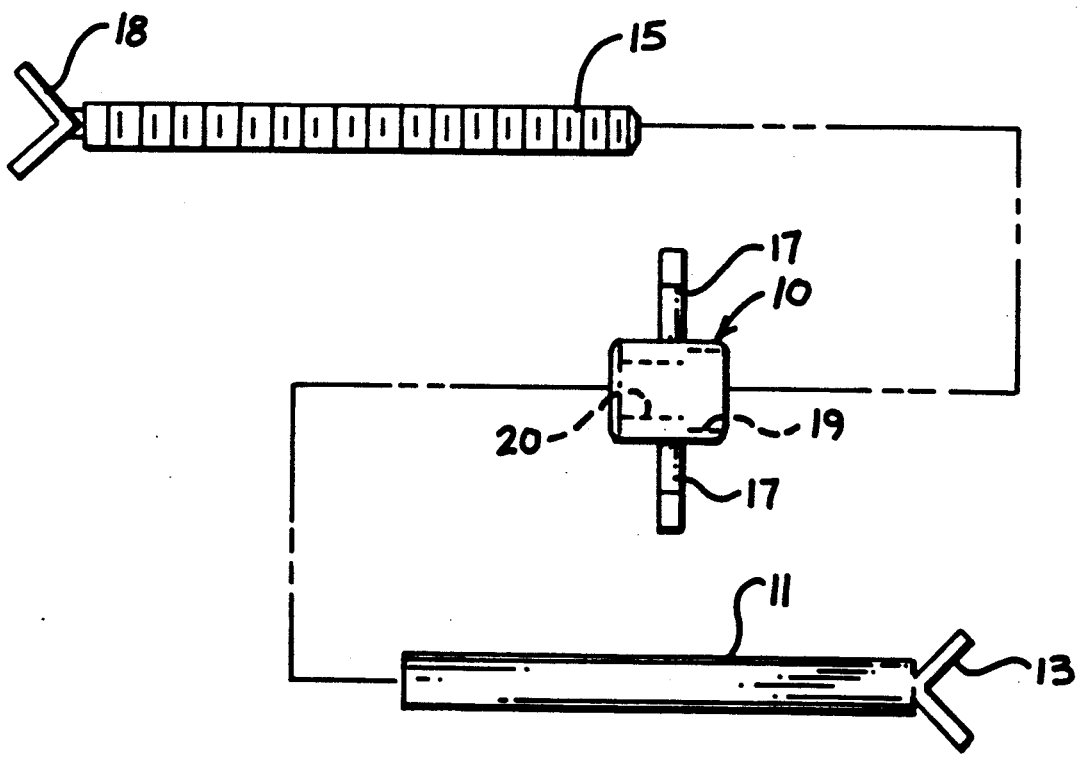

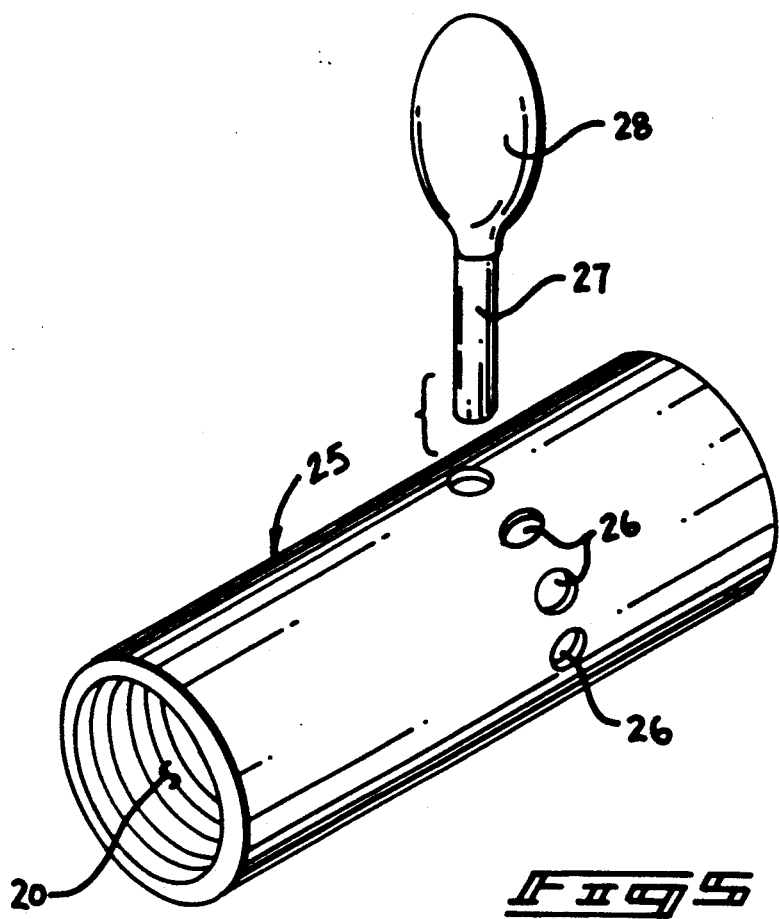
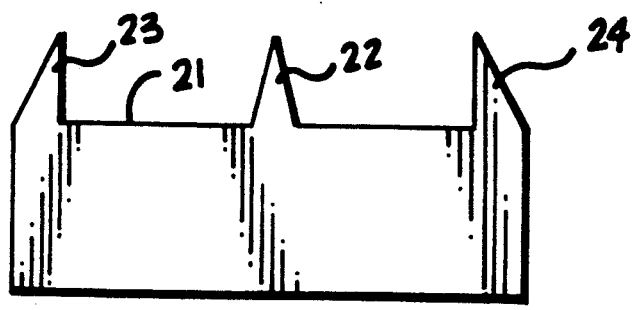

SPREADER APPARATUS

BACKGROUND OF THE INVENTION

1. Field of the Invention

The field of invention relates to spreader apparatus, and more particularly pertains to a new and improved spreader apparatus wherein the same is utilized in spreading a rib cage of an animal in a hunting environment.

2. Description of the Prior Art

Various spreader apparatus of various configurations have been utilized in the prior art for application to particular environments. For example, U.S. Pat. No. 4,914,940 to Hebert sets forth a manner of spreading an exhaust manifold to enhance its removal and mounting relative to an automobile engine, wherein a threaded rod is received in a sleeve and the sleeve includes a plurality of wrench flats to enhance engagement of the sleeve by a wrench member.

U.S. Pat. No. 2,665,489 to Cunningham provides a central tube with a plurality of sleeves that are coaxially aligned relative to the tube, whereupon rotation of the tube effects extension or retraction of the rods relative to the sleeve.

U.S. Pat. No. 4,549,423 to Masui sets forth an arrangement wherein a rod is threadedly received within a tube, whereupon rotation of the rod effects extension of the rod relative to a tube in a screw jack arrangement.

U.S. Pat. No. 2,584,015 to Hawes provides for an adjustable fitting wherein a tube mounts a threaded rod therewithin, wherein a plurality of clamping members secure and arrest movement of the rod relative to the tube.

As such, it may be appreciated that there continues to be a need for a new and improved spreader apparatus as set forth by the instant invention which addresses both the problems of ease of use as well as effectiveness in construction for use in a hunting environment and as such, the present invention substantially fulfills this need.

SUMMARY OF THE INVENTION

In view of the foregoing disadvantages inherent in the known types of spreader apparatus now present in the prior art, the present invention provides a spreader apparatus wherein the same permits ease of assembly of a tube member to telescopingly receive a threaded rod therewithin utilizing a medial sleeve to effect axial extension of the rod relative to the tube. As such, the general purpose of the present invention, which will be described subsequently in greater detail, is to provide a new and improved spreader apparatus which has all the advantages of the prior art spreader apparatus and none of the disadvantages.

To attain this, the present invention provides an apparatus wherein an elongate tube receives a threaded rod therewithin, wherein a medial sleeve including a threaded bore is rotatable to effect extension and retraction of the threaded rod relative to the tube. The tube and rod each include "J" shaped jaw member coaxially aligned with the tube and rod to engage opposed portions of an animal rib cage to effect a spreading of the rib cage subsequent to a hunting procedure. The sleeve may optionally include an annular array of blind bores to slidably receive an elongate peg member to enhance rotation of the sleeve relative to the rod.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved spreader apparatus which has all the advantages of the prior art spreader apparatus and none of the disadvantages.

It is another object of the present invention to provide a new and improved spreader apparatus which may be easily and efficiently manufactured and marketed.

It is a further object of the present invention to provide a new and improved spreader apparatus which is of a durable and reliable construction.

An even further object of the present invention is to provide a new and improved spreader apparatus which is susceptible of a low cost of manufacture with regard to both materials and labor, and which accordingly is then susceptible of low prices of sale to the consuming public, thereby making such spreader apparatus economically available to the buying public.

Still yet another object of the present invention is to provide a new and improved spreader apparatus which provides in the apparatuses and methods of the prior art some of the advantages thereof, while simultaneously overcoming some of the disadvantages normally associated therewith.

Still another object of the present invention is to provide a new and improved spreader apparatus wherein the same may be readily transported during periods of non-use and easily assembled for spreading of a rib cage of a hunting animal prior to cleaning the animal and subsequent transport thereof.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic side view of the instant invention.

FIG. 4 is an orthographic side view, in exploded illustration, of the instant invention.

FIG. 5 is an isometric illustration of a modified medial sleeve utilized by the instant invention.

FIG. 6 is an orthographic view, taken along the lines 6—6 of FIG. 5 in the direction indicated by the arrows.

DESCRIPTION OF THE PREFERRED EMBODIMENT

Figure 1:
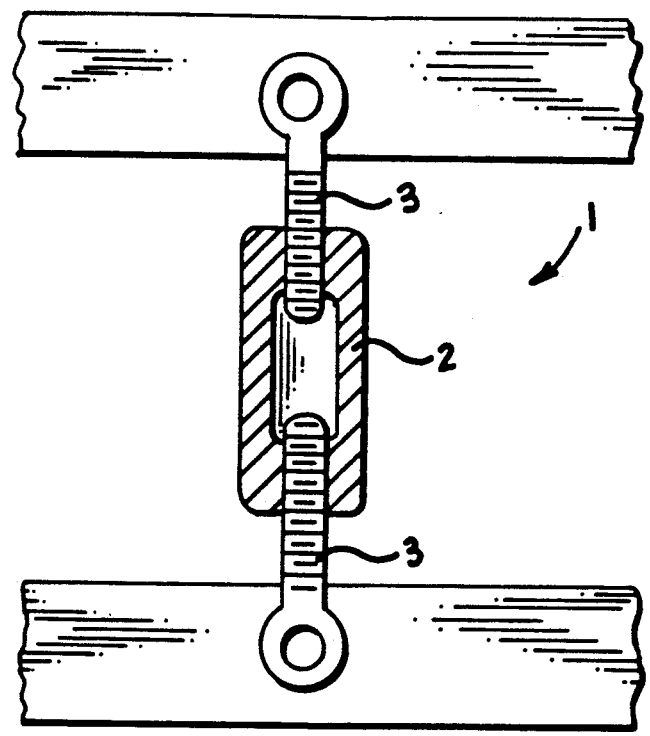
FIG. 1 is an orthographic side view, partially in section, of a prior art spreader apparatus.

With reference now to the drawings, and in particular to FIGS. 1 to 8 thereof, a new and improved spreader apparatus embodying the principles and concepts of the present invention and generally designated by the reference numeral 10 will be described.

Figure 2:
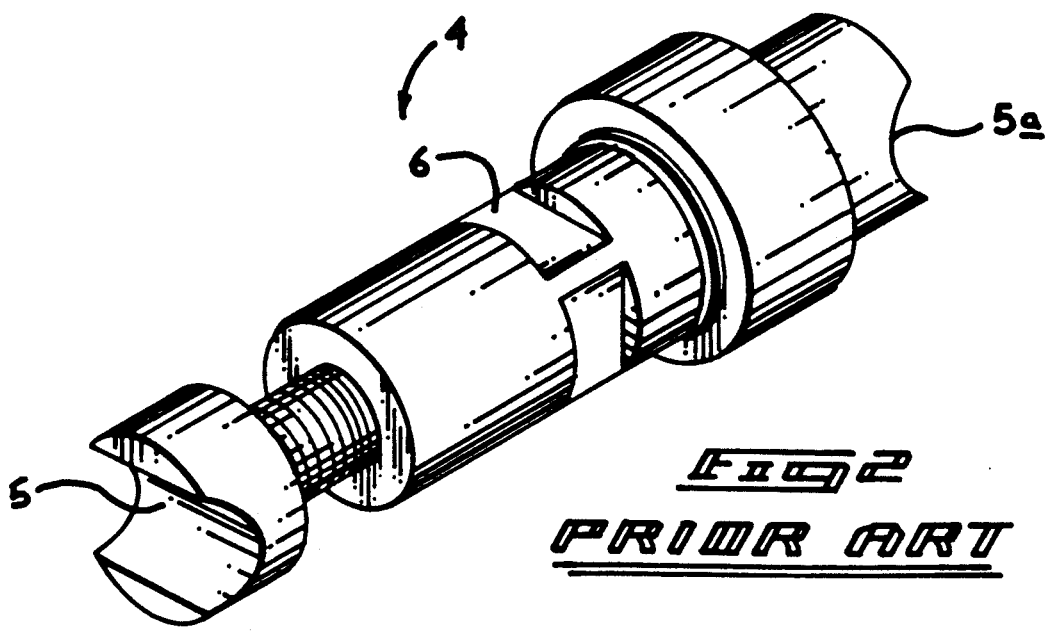
FIG. 2 is an isometric illustration of a further example of a prior art spreader apparatus.

FIG. 1 illustrates a prior art spreader apparatus 1, wherein the tube 2 includes a plurality of threaded rods 3 that are reciprocatably mounted relative to the tube and upon rotation of the tube the rods are extended or retracted relative to the tube, in a manner as set forth in U.S. Pat. No. 2,665,489. FIG. 2 illustrates a further prior art spreader apparatus 4, wherein a central tube includes wrench flats 6, with a threaded rod receivable therewithin and a forward jaw 5 and a rear jaw 5a pivotally mounted relative to the tube to retain orientation of the jaws during a spreading of the jaws 5 and 5a relative to the central tube, as set forth in U.S. Pat. No. 4,914,940.

Figure 7:
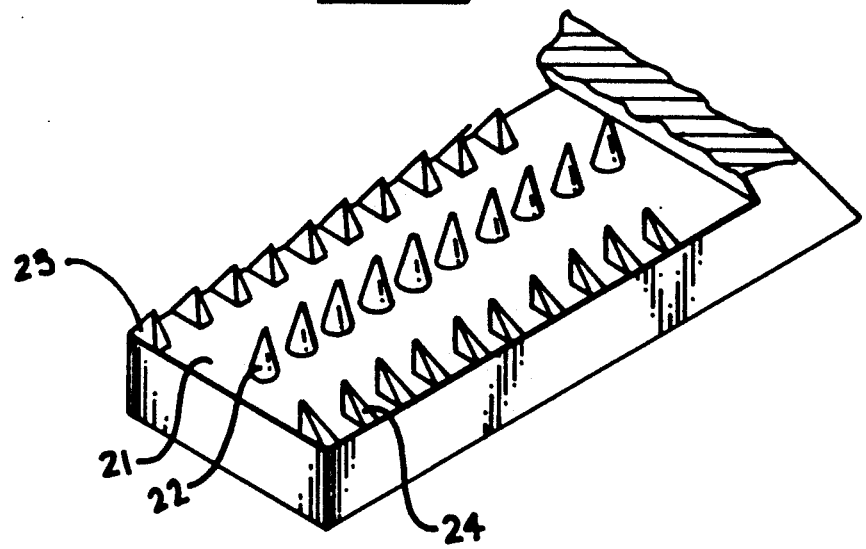
FIG. 7 is a partial isometric illustration of a jaw face utilized by the "V" shaped jaws of the instant invention.

More specifically, the spreader apparatus 10 of the instant invention essentially comprises an elongate, coaxially aligned receiving tube 11 defined by a predetermined length and a predetermined external diameter. The tube includes an internal rod receiving bore 12 directed coaxially therealong and integrally mounting a first "V" shaped jaw 13 at a rear terminal end of the tube. The first "V" shaped jaw 13 is coaxially aligned relative to the tube, as illustrated in FIG. 3. An externally threaded rod defined by a second diameter less than the first diameter is receivable telescopingly within the rod receiving bore and a medially positioned sleeve 16 rotatably mounted upon the forward end of the tube 11 receives the tube within a socket 19 that is rotatably mounted on the forward end of the tube 11. Diametrically opposed grasping rods 17 are fixedly mounted to opposed sides of the cylindrical medial sleeve 16. An internally threaded guide bore 20 threadedly receives the threaded rod 15, whereupon rotation of the sleeve 16 effects extension or retraction of the rod 15 relative to the tube 11. A second "V" shaped jaw 18 is coaxially and integrally mounted to a forward end of the rod 15. The jaws 13 and 18 may optionally be coated with a polymeric material to enhance their engagement with opposed sides of the rib cavity (not shown). FIGS. 6 and 7 illustrate the jaw surfaces of the first and second "V" shaped jaws 13 and 18, wherein each of the "V" shaped jaws includes a planar jaw surface 21 mounting a first row of conical central teeth 22, with a second row of pyramidal teeth 23 and a third row of pyramidal teeth 24 arranged parallel relative to the conical central row on opposed side edges of the planar jaw surface 21. It is understood that each of the jaw surfaces include such an array of teeth to enhance engagement with a rib cage of an animal, as it is understood that enhanced engagement is required due to the slippery nature of a freshly downed animal subsequent to a hunting event.

Figure 8:
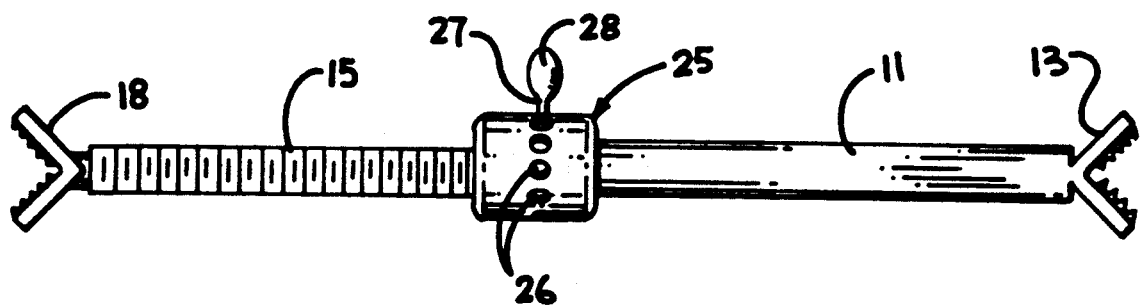
FIG. 8 is an orthographic side view of the instant invention utilizing a modified medial sleeve.

FIGS. 5 and 8 illustrate the use of a modified sleeve, wherein the modified sleeve utilizes an annular array of blind bores 26 medially positioned through the exterior surface of the sleeve to receive a removable peg member 27 that in turn includes an enlarged grasping knob 28, wherein the peg member 27 is selectively insertable within successive ones of the bores 18 to enhance rotation of the sleeve and effect selective extension or retraction of the rod 15 relative to the tube 11. In this manner, the organization is easily disassembled for storage and transport during periods of non-use.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spreader apparatus comprising, in combination, an elongate tube defined by a predetermined length and a predetermined first diameter, including a tube forward end and a tube rear end, the tube forward end fixedly mounting a first "V" shaped jaw thereon, and the tube including a rod receiving bore directed therethrough, and an externally threaded rod defined by a rod length less than the predetermined length slidably receivable within the tube, the rod defined by a rod forward end and a rod rear end, the rod forward end directed within the tube, and the rod rear end fixedly and orthogonally mounting a second "V" shaped jaw thereon, and sleeve means rotatably mounted on the tube rear end for adjustably directing the threaded rod coaxially relative to the tube, and wherein the sleeve means includes a cylindrical sleeve, the cylindrical sleeve including a cylindrical socket recess directed through a first end of the sleeve, wherein the socket is defined by a socket diameter substantially equal to the predetermined first diameter of the tube, and the socket including a communicating internally threaded bore directed from the socket to a remote second side of the sleeve, wherein the internally threaded bore is coaxially aligned with the socket and is in threaded communication with the externally threaded rod, and wherein the cylindrical sleeve includes an annular array of bores directed about an exterior surface of the sleeve, and a removable peg member selectively receivable within one of said bores to enhance rotation of the cylindrical sleeve relative to the threaded rod, and wherein the first and second "V" shaped jaws each include confronting planar surfaces, and each planar surface includes a first medial row of conical teeth, and a second row of pyramidal teeth directed along a first edge of each planar jaw surface parallel to the conical teeth, and a third row of pyramidal teeth directed along a second edge of the planar jaw surface parallel to the conical teeth to enhance engagement of each of the first and second "V" shaped jaws to a rib cage to enhance spreading of the rib cage subsequent to a hunting event.

* * * * *